United States Patent
Ferber

(10) Patent No.: US 7,574,303 B2
(45) Date of Patent: Aug. 11, 2009

(54) SEISMOGRAM CORRECTION FOR ABSORPTION EFFECTS

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 40 days.

(21) Appl. No.: 11/760,629

(22) Filed: Jun. 8, 2007

(65) Prior Publication Data

US 2008/0306693 A1  Dec. 11, 2008

(51) Int. Cl.
*G01V 1/28* (2006.01)
*G06F 19/00* (2006.01)

(52) U.S. Cl. .............................. 702/17; 702/14; 702/16; 367/30; 367/73; 181/102

(58) Field of Classification Search .................... 702/14, 702/16, 17; 367/30, 73; 181/102
See application file for complete search history.

(56) References Cited

U.S. PATENT DOCUMENTS

| | | | |
|---|---|---|---|
| 4,449,208 A | 5/1984 | Moeckel et al. | |
| 4,706,226 A | 11/1987 | Houghtaling | |
| 4,884,247 A | 11/1989 | Hadidi et al. | |
| 5,555,218 A * | 9/1996 | Chambers et al. | 367/73 |
| 7,382,683 B1 * | 6/2008 | Ferber et al. | 367/30 |
| 2006/0265132 A1 * | 11/2006 | Rickett | 702/14 |

FOREIGN PATENT DOCUMENTS

| | | |
|---|---|---|
| EP | 0 809 122 | 11/1997 |
| WO | WO 02/065372 | 8/2002 |
| WO | WO2006025823 | 3/2006 |
| WO | WO2006025824 | 3/2006 |

OTHER PUBLICATIONS

Ram et al., 'Synthetic Seismograms for Layered Earth Geological Model Using the Absorption and Dispersion Phenomena', 1997, Pure & Applied Geophysics, p. 541-551.*

Badri And Mooney, "Q measurements from compressional seismic waves in unconsolidated sediments," *Geophysics*, 52(6):772-784, 1987.

(Continued)

*Primary Examiner*—Edward Raymond
*Assistant Examiner*—Elias Desta
(74) *Attorney, Agent, or Firm*—Ari Pramudji; Liangang (Mark) Ye; Jeffrey E. Griffin

(57) ABSTRACT

Correcting seismograms to compensate for absorption or dissipative effects that occur in the earth. In one implementation, a ratio of traveltime (t) to absorption parameter (Q) may be computed for each seismogram. The ratio may be referred to as R. Further, the ratio may be computed for a predetermined set of traveltimes. As a result, a system of linear equations may be generated, where each ratio is represented by a linear equation having a number of unknown components. The system of linear equations may then be solved for the unknown components. The solved components may then be recombined or added to generate an estimate of R. In one implementation, only a portion of the solved components may be added. The seismograms may then be corrected using the estimate of R. As such, the seismograms may be corrected for absorption effects in a surface consistent manner.

20 Claims, 6 Drawing Sheets

OTHER PUBLICATIONS

Dasgupta and Clark, "Estimation of Q from surface seismic reflection data," *Geophysics*, 63(6):2120-2128, 1998.

Futterman, "Dispersive body waves," *J. Geophys. Res.*, 67(13):5279-5291, 1962.

Hale, "Q-adaptive deconvolution," *SEG Technical Program Expanded Abstracts*, 1:82-83, 1982.

Hargreaves and Calvert, "Inverse Q filtering by Fourier transform," *Geophys.*, 56(4):519-527, 1991.

Robinson, "A technique for the continuous representation of dispersion in seismic data," *Geophys.*, 44(8):1345-1351, 1979.

Varela, Rosa and Ulrych, "Modeling of attenuation and dispersion," *Geophys.*, 58(8):1167-1173, 1993.

Zhang and Ulrych, "Estimation of quality factors from CMP records," Geophys., 67(5):1542-1547, 2002.

International Search Report, dated Sep. 5, 2008, for Application No. PCT/US2008/065652.

\* cited by examiner

SEISMOGRAM CORRECTION FOR ABSORPTION EFFECTS

BACKGROUND

1. Field of the Invention

Implementations of various technologies described herein generally relate to correcting seismograms from absorption effects of seismic waves in the earth.

2. Description of the Related Art

The following descriptions and examples do not constitute an admission as prior art by virtue of their inclusion within this section.

As seismic waves travel through the earth, some of the energy stored in the seismic waves may be lost due to absorption or dissipative effects, i.e., the energy may be dissipated into heat. As a result, some of the valuable information carried by the seismic waves may be lost.

A common technique used to correct seismograms to compensate for the absorption effects is Q-filtering, which is described in *Q-Adaptive Deconvolution*, by D. Hale, Stanford Exploration Project, Report 30, 1982. Hale discloses two iterative procedures for implementing inverse Q-filtering. However, the procedures disclosed by Hale make several assumptions that cause Hale to arrive at an approximate dispersion relationship. Use of the approximate dispersion relationship, in turn, degrades the value of the Q compensation obtained by Hale.

SUMMARY

Described herein are implementations of various techniques directed to a method for correcting seismograms to compensate for absorption effects that occur in the earth. In one implementation, the method may include computing a ratio of traveltime to absorption parameter for each seismogram to generate a system of linear equations. The ratio is expressed as a linear equation having a plurality of components. The method may further include solving the system of linear equations for the plurality of components, adding one or more of the solved components to generate an estimate of the ratio of traveltime to absorption parameter, and correcting the seismograms using the estimate of the ratio of traveltime to absorption parameter.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed for correcting seismograms to compensate for absorption or dissipative effects that occur in the earth. In one implementation, a ratio of traveltime (t) to absorption parameter (Q) may be computed for each seismogram. The ratio may be referred to as R. Further, the ratio may be computed for a predetermined set of traveltimes. As a result, a system of linear equations may be generated, where each ratio is represented by a linear equation having a number of unknown components.

The system of linear equations may then be solved for the unknown components. The solved components may then be recombined or added to generate an estimate of R. In one implementation, only a portion of the solved components may be added. The seismograms may then be corrected using the estimate of R. As such, the seismograms may be corrected for absorption effects in a surface consistent manner. In one implementation, various techniques described herein may be used prior to digital group forming.

One or more techniques for correcting seismograms to compensate for absorption or dissipative effects that occur in the earth in accordance with various implementations will now be described in more detail with reference to FIGS. 1-6 in the following paragraphs.

Figure 1:
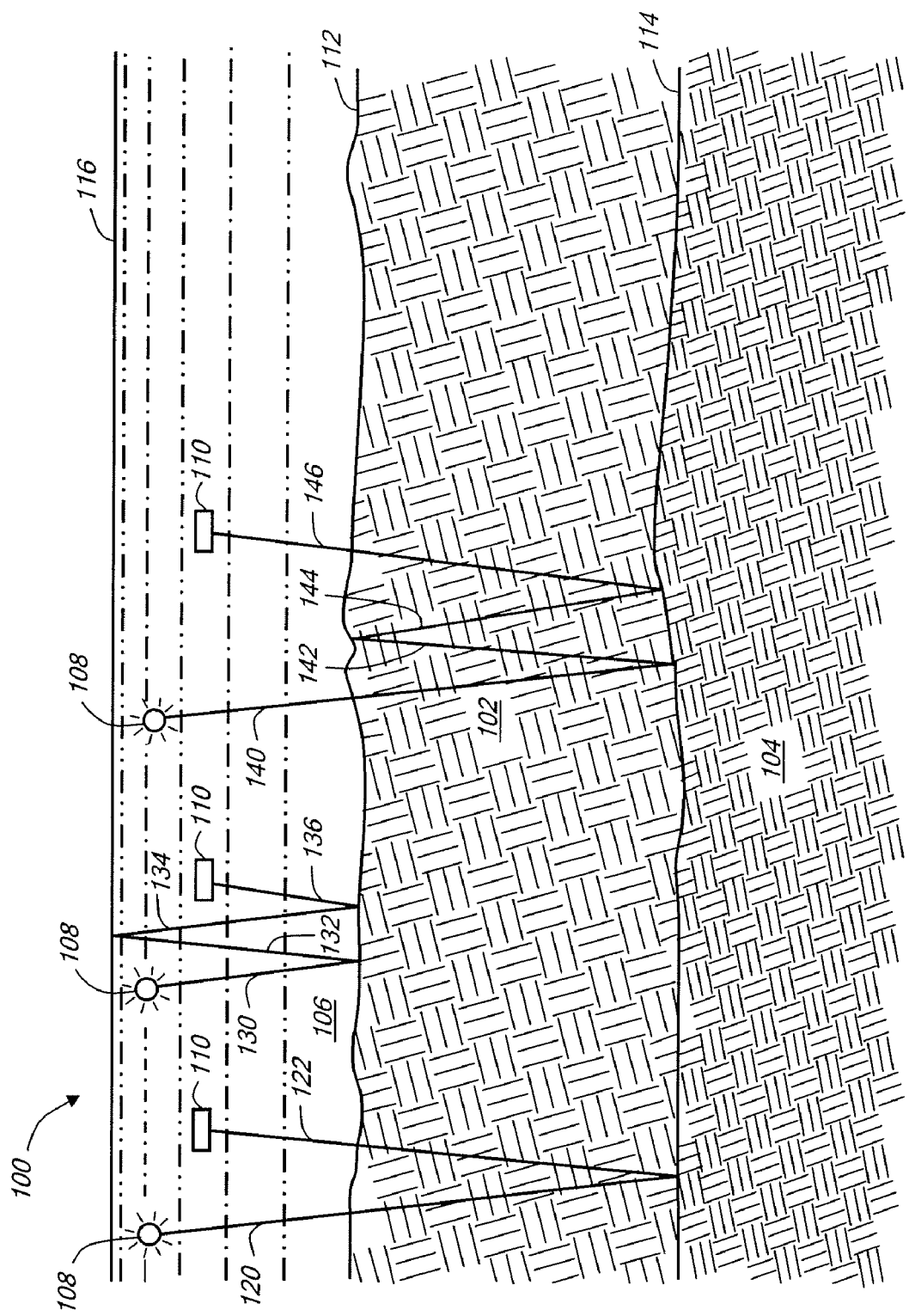
FIG. 1 illustrates a schematic view of marine seismic surveying in connection with implementations of various techniques described herein.

FIG. 1 illustrates a schematic view of marine seismic surveying 100 in connection with implementations of various techniques described herein. Subterranean formations to be explored, such as 102 and 104, lie below a body of water 106. Seismic energy sources 108 and seismic receivers 110 may be positioned in the body of water 106, typically by one or more seismic vessels (not shown). A seismic source 108, such as an air gun and the like, may create seismic waves in the body of water 106. As a result, a portion of the seismic waves may travel downward through the body of water 106 toward the subterranean formations 102 and 104 beneath the body of water 106. When the seismic waves reach a seismic reflector, a portion of the seismic waves may reflect upward and another portion of the seismic waves may continue downward. The seismic reflector may be the water bottom 112 or one of the interfaces between subterranean formation, such as interface 114 between formations 102 and 104. When the reflected waves traveling upward reach the water/air interface at the water surface 116, a majority portion of the waves may reflect downward again. Continuing in this fashion, seismic waves may reflect multiple times between upward reflectors, such as the water bottom 112 or formation interface 114, and the downward reflector at the water surface 116 above. Each time the reflected waves propagate past the position of a seismic receiver 110, the seismic receiver 110 may sense the reflected waves and generate representative seismic signals. These seismic signals may then be used to yield valuable information regarding the geophysical characteristics of the explored subterranean formations.

However, as seismic waves travel through various subterranean formations, a portion of the amplitude of the seismic waves may dissipate into heat absorbed by the subterranean formations. As a result, some of the valuable information carried by the seismic waves may be lost. Accordingly, implementations of various techniques described herein are directed to a method for compensating for the loss of amplitude of the seismic waves due to absorption or dissipative effects that occur at the subterranean formations.

In one implementation, seismic data may be corrected using Q-filtering techniques. Q represents absorption parameter and may often be referred to as the seismic quality factor. Q may also be a function of traveltime t and as such be referred to as Q(t). Q-filtering may be interpreted as the application of time-invariant filters having an amplitude correction filter expressed as $A_R(f)=\exp(\text{sgn}\pi fR)$ and a phase correction filter expressed as $$\varphi_R(f) = \text{sgn} 2f \ln\left(\frac{f_c}{f}\right) R,$$

where $R=t/Q$, f represents the frequency of the input seismogram in the frequency domain, $f_c$ represents the cutoff frequency of the input seismogram, sgn=−1 when the filters are used for modeling absorption and sgn=1 when the filters are used for compensation, i.e., inverse Q-filtering.

The amplitude correction filter may be decomposed surface consistently, i.e., the absorption correction filter may be expressed as a multiplication of a number of components. For instance, in one implementation, the absorption correction filter $A_R(f)$ may be expressed as follows:

$$A_R(f)=A_{R_a}(f)A_{R_s}(f)A_{R_r}(f)A_{R_o}(f)A_{R_i}(f) \qquad \text{Equation (1)},$$

where $R_a$ represents a multiplicative average absorption effect, $R_s$ represents residual absorption effects attributed to the sources, $R_r$ represents residual absorption effects attributed to the receivers, $R_o$ represents residual absorption effects attributed to offsets between receivers and the sources and $R_i$ represents residual absorption effects attributed to common mid point of the seismograms. Although the absorption filter $A_R(f)$ is illustrated as being decomposed into five components, it should be understood that the absorption filter $A_R(f)$ may be decomposed into less than five components or more than five components. For instance, the absorption filter $A_R(f)$ may be decomposed into azimuthal variations in addition to the five components mentioned above.

An application of a natural logarithm to $A_R(f)=\exp(\text{sgn}\pi fR)$ would yield $$\ln(A_R(f))=\text{sgn}\pi fR \qquad \text{Equation (2)}.$$

An application of a natural logarithm to the right hand side of equation (1)

would yield $\ln(A_R(f))=\text{sgn}\pi fR_a+\text{sgn}\pi fR_s+\text{sgn}\pi fR_r+\text{sgn}\pi fR_o+\text{sgn}\pi fR_i$ Equation (3).

Substituting $\ln(A_R(f))$ with $\text{sgn}\pi fR$ would yield a linear equation as expressed below:

$$\text{sgn}\pi fR=\text{sgn}\pi fR_a+\text{sgn}\pi fR_s+\text{sgn}\pi fR_r+\text{sgn}\pi fR_o+\text{sgn}\pi fR_i \qquad \text{Equation (4)}.$$

Dividing equation (4) with $\text{sgn}\pi f$ would yield a linear equation as expressed below:

$$R(t)=R_a(t)+R_s(t)+R_r(t)+R_o(t)+R_i(t)+N(t) \qquad \text{Equation (5)},$$

where N(t) represents noise, i.e., the non-surface consistent portion of the seismograms. Hence, removing N(t) would yield to an estimate of R(t), which may be expressed as linear equation $$\hat{R}(t)=R_a(t)+R_s(t)+R_r(t)+R_o(t)+R_i(t) \qquad \text{Equation (6)}.$$

Figure 2:
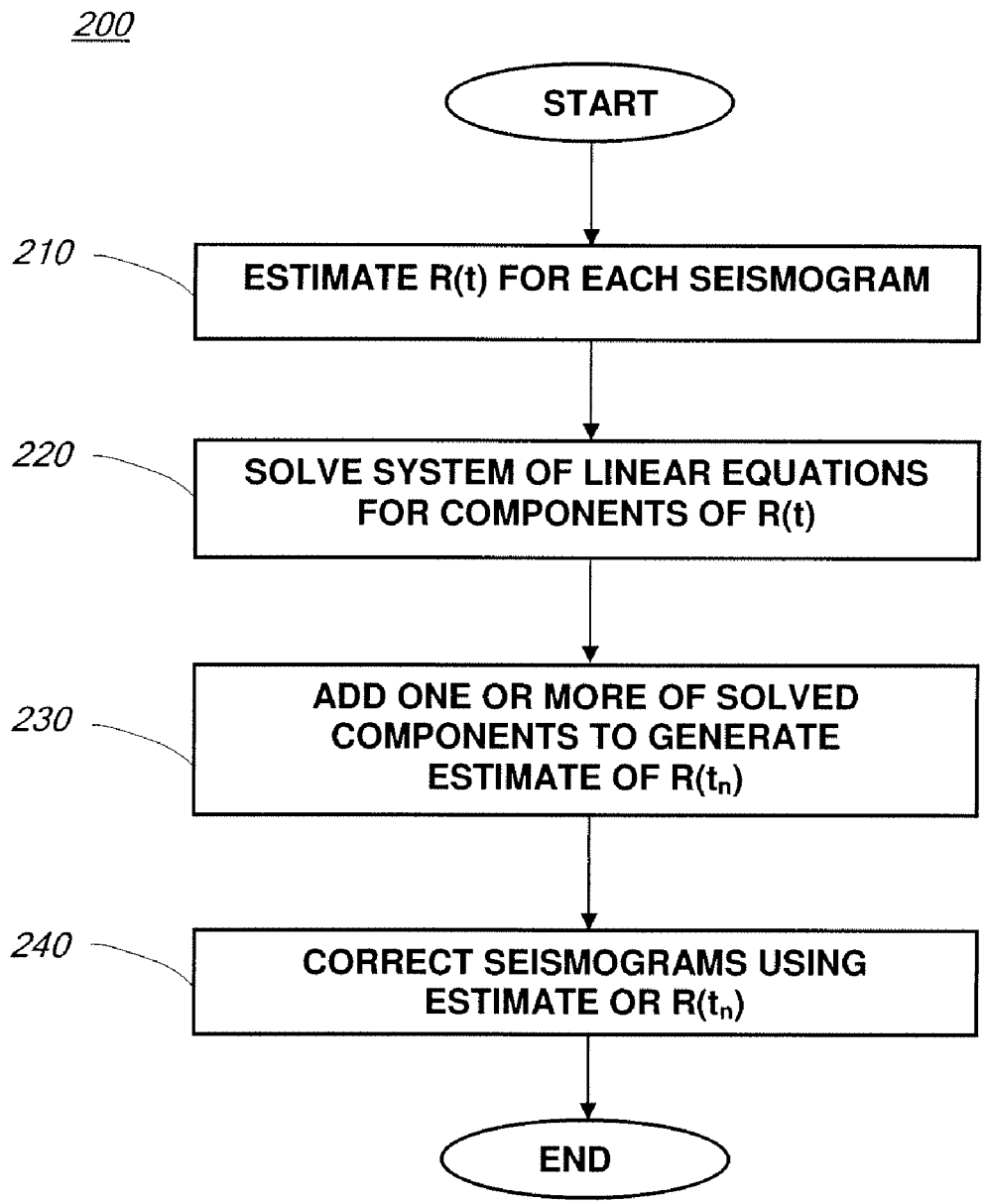
FIG. 2 illustrates a flow diagram of a method for correcting seismic data for absorption effects in accordance with implementations of various techniques described herein.

FIG. 2 illustrates a flow diagram of a method 200 for correcting seismograms for absorption effects in accordance with implementations of various techniques described herein. At step 210, a ratio of traveltime (t) to absorption parameter (Q(t)) may be estimated for each seismogram. The ratio of traveltime (t) to absorption parameter (Q(t)) may be referred to as R(t). The ratio R(t) may be estimated for predetermined instances of traveltimes, e.g., 500 ms, 1000 ms, 1500 ms, etc. As such, the estimation of ratio R(t) may be expressed as $$R(t_n) = \frac{t_n}{Q(t_n)},$$

where n represents predetermined instances of traveltimes.

Figure 3:
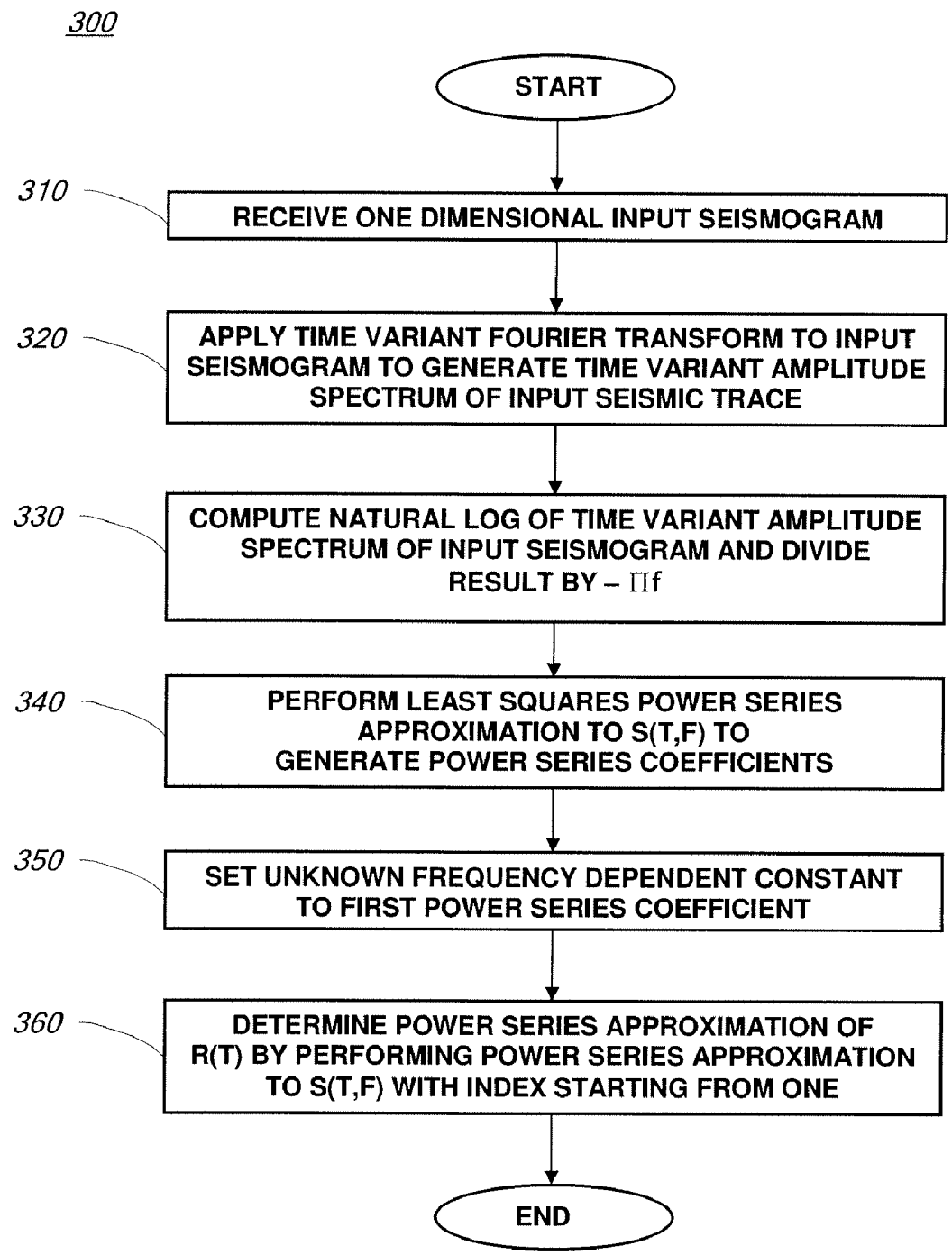
FIG. 3 illustrates a flow diagram of a method for estimating a ratio of traveltime to absorption parameter in connection with implementations of various techniques described herein.

FIG. 3 illustrates a flow diagram of a method 300 for estimating R(t) in connection with implementations of various techniques described herein. At step 310, a one dimensional input seismogram, i.e., based on traveltime t, may be received. At step 320, a time variant Fourier transform may be applied to the input seismogram to generate a time variant amplitude spectrum of the input seismogram, which may be represented as X(t, f). The time variant amplitude spectrum of the input seismogram X(t, f) may be expressed as:

$$X(t,f)=A(t,f)W(f)I(f) \qquad \text{Equation (7)},$$

where A(t, f) represents a time variant exponential absorption term, W(f) represents a time invariant source wavelet, and I(f) represents a time-invariant reflectivity. The time variant exponential absorption term A(t, f) may be expressed as:

$$A(t,f)=\exp(-\pi fR(t)) \qquad \text{Equation (8)},$$

where $$R(t) = \frac{t}{Q(t)}.$$

At step 330, the natural logarithm of the time variant amplitude spectrum of the input seismogram X(t, f) may be calculated and the result may be divided by $-\pi f$. Step 330 may be expressed as:

$$S(t, f) = \frac{\ln(X(t, f))}{-\pi f} = R(t) + C(f). \qquad \text{Equation (9)}$$

At step 340, a least squares power series approximation to S(t, f) may be performed to generate a plurality of power series coefficients $s_i$, i.e., $s_0, s_1, s_2, \ldots s_n$. The least squares estimate to the power series coefficients may be computed by solving the following minimization problem:

$$\left\| S(t,f) - \sum_{i=0}^{n} s_i t^i \right\|^2 \to \min.$$

In one implementation, the least squares powers series is of a low order, i.e., n is a small number, e.g., from about 2 to about 8.

S(t, f) may also be expressed as: $S(t,f)=R(t)+c(f)$ where c(f) represents an unknown frequency dependent constant. At step 350, the unknown frequency dependent constant c(f) may be set to be equal to the first power series coefficient $s_0$. At step 360, a power series approximation to R(t) may be determined by performing a power series approximation to S(t, f) with the index starting from 1, as opposed to 0, i.e., without using the first power series coefficient $s_0$. The power series approximation to R(t) may be expressed as:

$$\hat{R}(t) = \sum_{i=1}^{n} s_i t^i.$$

In this manner, the ratio R (t) may be approximated by the power series approximation.

As such, at the end of step 210, a linear equation $\hat{R}(t)=R_a(t)+R_s(t)+R_r(t)+R_o(t)+R_i(t)$ may be generated for each seismogram for predetermined instances of traveltimes. At step 220, a system of linear equations for all the seismograms may be solved for $R_a(t), R_s(t), R_r(t), R_o(t)$ and $R_i(t)$. As mentioned above, $R_a$ represents a multiplicative average absorption effect, $R_s$ represents residual absorption effects attributed to the sources, $R_r$ represents residual absorption effects attributed to the receivers, $R_o$ represents residual absorption effects attributed to offsets between receivers and the sources and $R_i$ represents residual absorption effects attributed to common mid point of the seismograms. Although the system of linear equations is discussed with reference to solving five components, it should be understood that is some implementations the system of linear equations may be solved for more or less components.

At step 230, one or more of the solved components may be summed or recombined to generate an estimate of $R(t_n)$. Again, all or only a portion of the solved components may be summed or recombined.

At step 240, the seismograms may be corrected using the estimate of $R(t_n)$ computed in step 230. In one implementation, each seismogram may be corrected using its own estimate of $R(t_n)$. In another implementation, each seismogram may be corrected using a number of estimates of $R(t_n)$ based on the number of instances of traveltimes.

Figure 4:
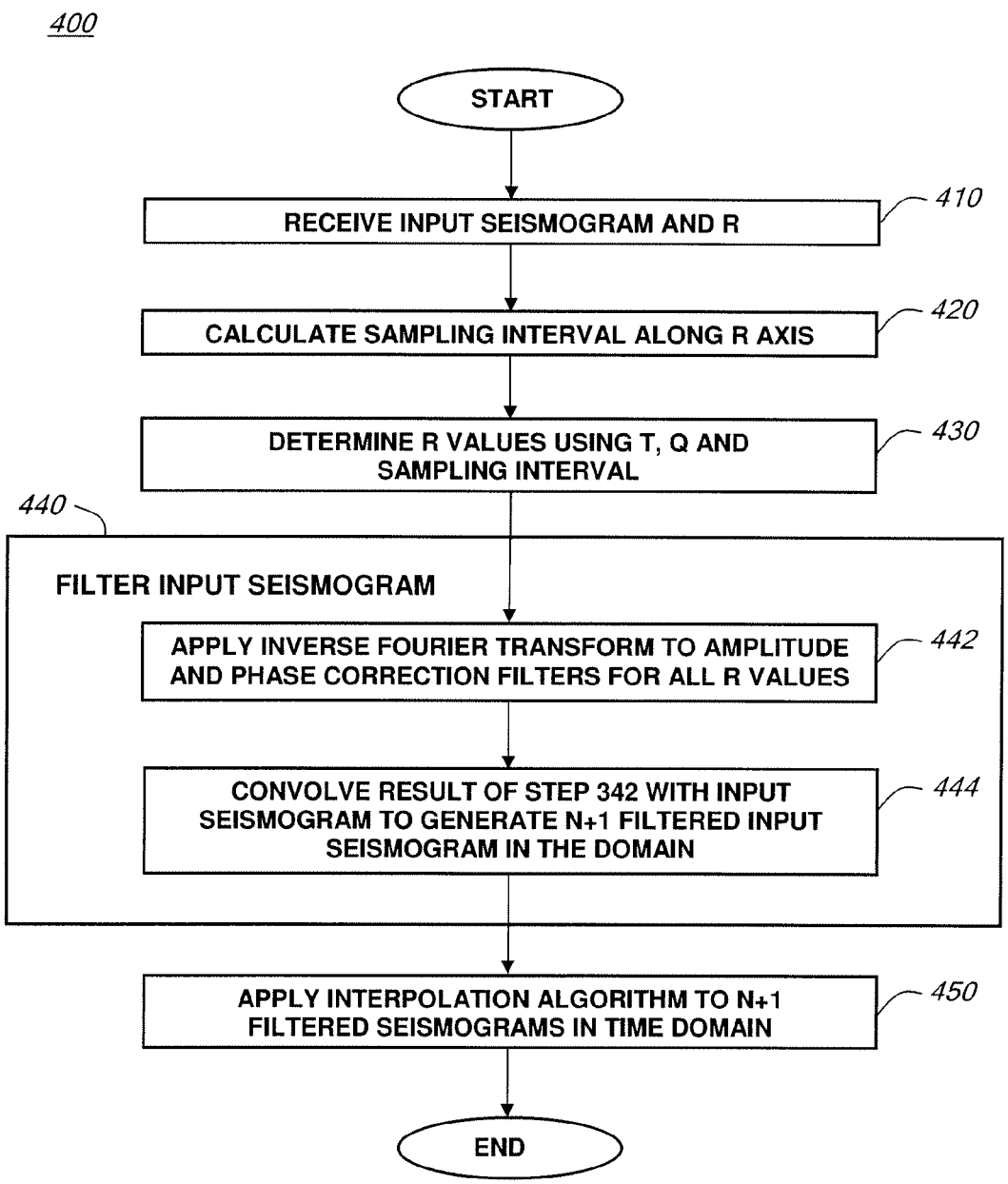
FIG. 4 illustrates a method for correcting a seismogram using the ratio in connection with various implementations described herein.
Figure 5:
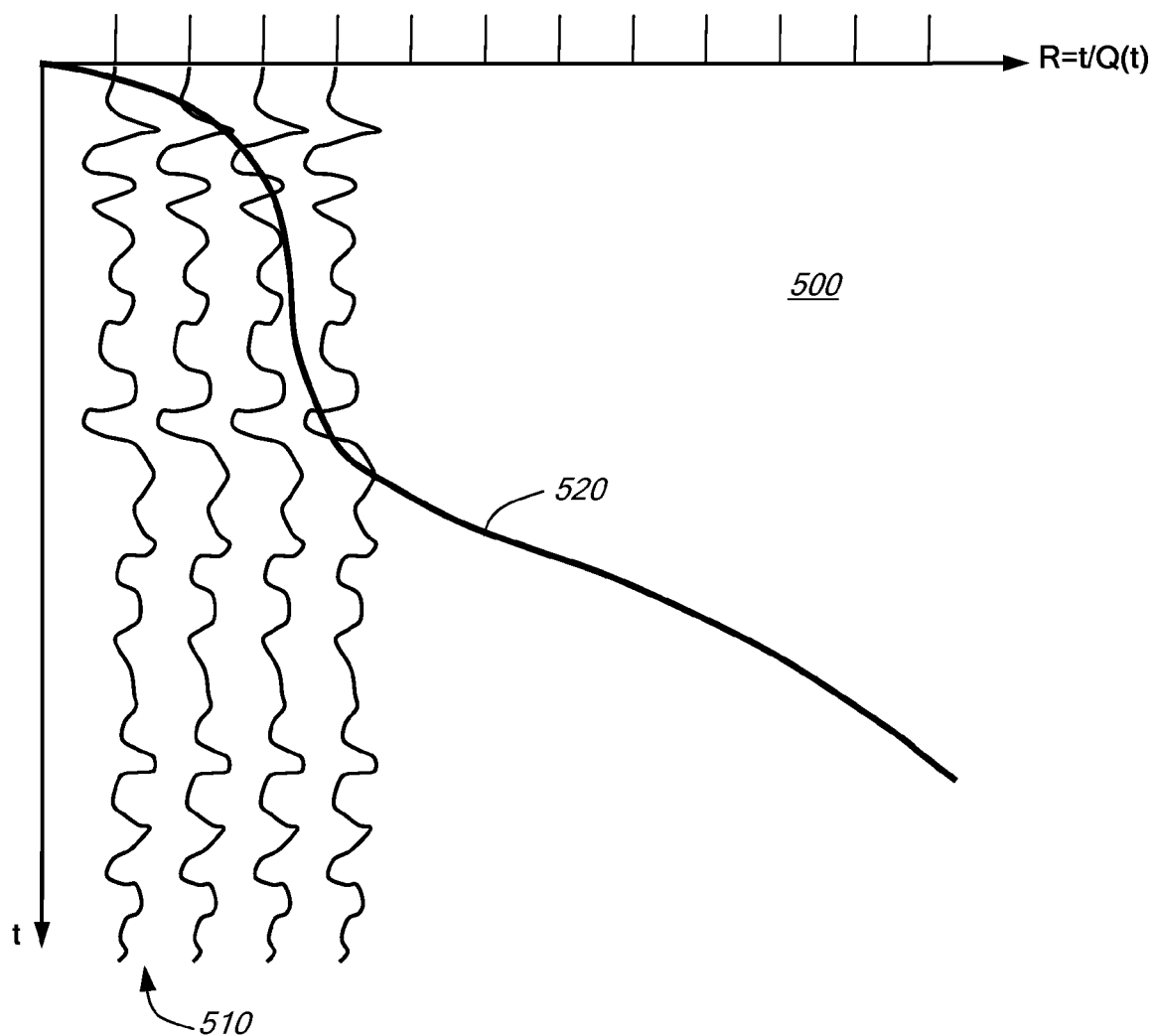
FIG. 5 illustrates t by Q gather in accordance with various implementations described herein.

FIG. 4 illustrates a method 400 for correcting a seismogram from dissipative effects using the estimate of $R(t_n)$ in connection with various implementations described herein. At step 410, an input seismogram and the ratio of traveltime t to absorption parameter Q(t), i.e., R(t), for the input seismogram may be received. The relationship between Q(t) and R(t) may be illustrated in a t by Q gather 500 shown in FIG. 5. The t by Q gather 500 may include a horizontal axis of R and a vertical axis of traveltime t. The t by Q gather 500 may be made up of n+1 filtered input seismic traces 510. The first filtered input seismic trace 510 may be generated using the $R_{min}$ and the last filtered input seismic trace 510 may be generated using $R_{max}$. The t by Q gather 500 may also include an R(t) curve 520 intersecting the n+1 filtered input seismic traces 510. The t by Q gather may be sliced through along the R(t) curve 520 to generate the corrected input seismogram.

At step 420, a sampling interval along the R axis, ΔR, is calculated according to $$\Delta R = \frac{\pi e}{2 f_{\max}}, \quad \text{Equation (10)}$$

where $f_{max}$ represents an estimate of the maximum frequency in the input seismic trace. For example, the sampling interval along the R axis may be about 0.043 seconds for a maximum frequency of about 100 Hz.

At step 430, a plurality of R values may be determined using t, Q(t) and the sampling interval ΔR. In one implementation, n+1 R values may be determined, where $$R_{\min} = \min\left(\frac{t}{Q(t)}\right), R_{\max} = \max\left(\frac{t}{Q(t)}\right), \text{ and } R_i = R_{\min} + (i-1)\Delta R.$$

At step 440, the input seismogram may be filtered using an amplitude correction filter $A_R(f)=\exp(\text{sgn}\pi t f R)$, a phase correction filter $$\varphi_R(f) = \text{sgn} 2 f \ln\left(\frac{f\max}{f}\right) R,$$

and the R values generated at step 430. In one implementation, the input seismogram may be filtered by first applying an inverse Fourier transform to the amplitude and phase correction filters for all R values (step 442). In this manner, the amplitude and phase correction filters may be transformed to the time domain. At step 444, the result of step 442 may be convolved with the input seismogram to generate the n+1 filtered input seismograms in the time domain, which make up the t by Q gather. The input seismogram may also be filtered with other types of convolution filters commonly known by persons with ordinary skill in the art. At step 450, an interpolation algorithm may be applied to the t by Q gather along the R(t) curve to derive a corrected input seismogram. The interpolation algorithm may be a linear interpolation or any other interpolation algorithm commonly known by those skilled in the art. The application of the interpolation algorithm may also be known as "slicing through" the t by Q gather along the R(t) curve. Steps 410 through 450 may be repeated for other input seismograms.

Figure 6:
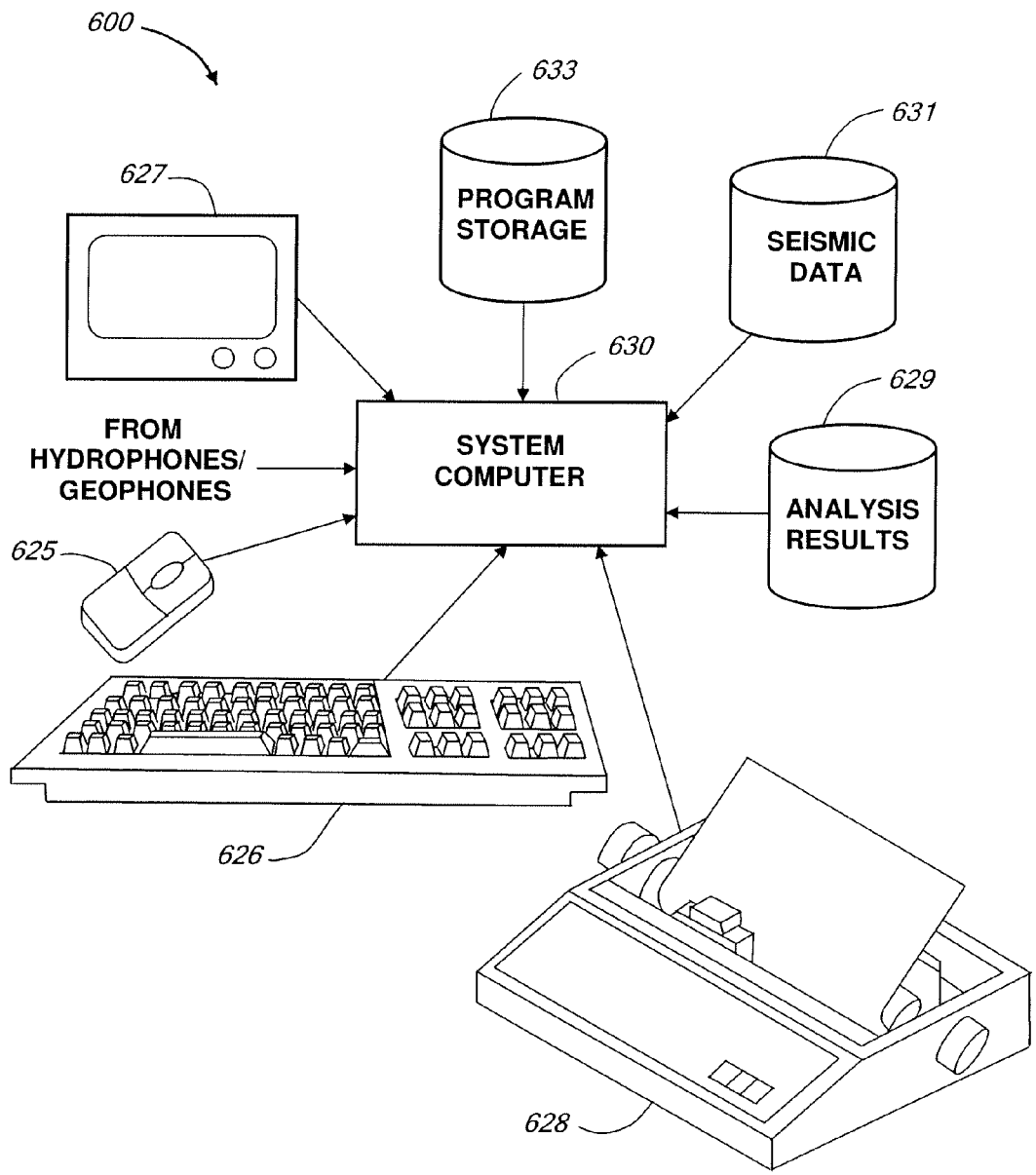
FIG. 6 illustrates a computing system, into which implementations of various technologies described herein may be implemented.

FIG. 6 illustrates a computing system 600, into which implementations of various technologies described herein may be implemented. The computing system 600 may include one or more system computers 630, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various technologies described herein. The program instructions may be written in a computer programming language, such as C++, Java and the like. The program instructions may be stored in a computer-readable medium, such as program disk storage device 633. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. These signals, after conventional formatting and other initial processing, may be stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for correcting seismograms to compensate for absorption effects that occur in the earth, comprising:
   computing a ratio of traveltime to absorption parameter for each seismogram to generate a system of linear equations, the ratio being expressed as a linear equation having a plurality of components;
   solving the system of linear equations for the plurality of components;
   adding one or more of the solved components to generate an estimate of the ratio of traveltime to absorption parameter; and
   correcting the seismograms using the estimate of the ratio of traveltime to absorption parameter.

2. The method of claim 1, wherein the plurality of components comprise a multiplicative average absorption effect, residual absorption effects attributed to one or more sources used to acquire the seismograms, residual absorption effects attributed to one or more receivers used to acquire the seismograms, residual absorption effects attributed to one or more offsets between the receivers and the sources, residual absorption effects attributed to a common mid point of the seismograms, or combinations thereof.

3. The method of claim 1, wherein each linear equation excludes a noise component.

4. The method of claim 1, wherein the seismograms are corrected before digital group forming.

5. The method of claim 1, wherein the ratio is computed at a predetermined set of traveltimes.

6. The method of claim 1, wherein the ratio of traveltime to absorption parameter is computed by:
   receiving a seismogram;
   applying a time variant Fourier transform to the seismogram to generate a time variant amplitude spectrum of the seismogram;
   dividing the natural logarithm of the time variant amplitude spectrum by $-\pi f$; and
   performing a power series approximation to the result with an index starting from one to generate an estimated value of the ratio of traveltime to absorption parameter.

7. The method of claim 6, further comprising performing a least squares power series approximation to the result to generate a plurality of power series coefficients.

8. A computer-readable medium having stored thereon computer-executable instructions which, when executed by a computer, cause the computer to:
   compute a ratio of traveltime to absorption parameter for a seismogram to generate a system of linear equations, the ratio being expressed as a linear equation having a plurality of components;
   solve the system of linear equations for the plurality of components;

add one or more of the solved components to generate an estimate of the ratio of traveltime to absorption parameter; and correct the seismogram using the estimate of the ratio of traveltime to absorption parameter.

9. The computer-readable medium of claim 8, wherein the plurality of components comprise a multiplicative average absorption effect.

10. The computer-readable medium of claim 9, wherein the plurality of components comprise residual absorption effects attributed to one or more sources used to acquire the seismogram.

11. The computer-readable medium of claim 9, wherein the plurality of components comprise residual absorption effects attributed to one or more sources used to acquire the seismogram and residual absorption effects attributed to one or more receivers used to acquire the seismogram.

12. The computer-readable medium of claim 9, wherein the plurality of components comprise residual absorption effects attributed to one or more sources used to acquire the seismogram, residual absorption effects attributed to one or more receivers used to acquire the seismogram and residual absorption effects attributed to one or more offsets between the receivers and the sources.

13. The computer-readable medium of claim 9, wherein the plurality of components comprise residual absorption effects attributed to one or more sources used to acquire the seismogram, residual absorption effects attributed to one or more receivers used to acquire the seismogram, residual absorption effects attributed to one or more offsets between the receivers and the sources and residual absorption effects attributed to a common mid point of the seismogram.

14. The computer-readable medium of claim 8, wherein each linear equation excludes a noise component.

15. The computer-readable medium of claim 8, wherein the ratio is computed at a predetermined set of traveltimes.

16. A computer system, comprising:
a processor; and
a memory comprising program instructions executable by the processor to:
compute a ratio of traveltime to absorption parameter for a seismogram to generate a system of linear equations, the ratio being expressed as a linear equation having a plurality of components;
solve the system of linear equations for the plurality of components;
add one or more of the solved components to generate an estimate of the ratio of traveltime to absorption parameter; and
correct the seismogram using the estimate of the ratio of traveltime to absorption parameter.

17. The computer system of claim 16, wherein the plurality of components comprise a multiplicative average absorption effect, residual absorption effects attributed to one or more sources used to acquire the seismogram, residual absorption effects attributed to one or more receivers used to acquire the seismogram, residual absorption effects attributed to one or more offsets between the receivers and the sources, residual absorption effects attributed to a common mid point of the seismogram, or combinations thereof.

18. The computer system of claim 16, wherein each linear equation excludes a noise component.

19. The computer system of claim 16, wherein the ratio is computed at a predetermined set of travel times.

20. The computer system of claim 16, wherein the seismogram is corrected before digital group forming.

* * * * *